United States Patent
Prestel et al.

(10) Patent No.: US 10,077,677 B2
(45) Date of Patent: Sep. 18, 2018

(54) HOLDING DEVICE OF A COOLING TUBE FOR A TURBOJET CASING

(71) Applicant: SNECMA, Paris (FR)

(72) Inventors: Sébastien Jean Laurent Prestel, Coubert (FR); Baptiste Marie Aubin Pierre Jouy, Paris (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 410 days.

(21) Appl. No.: 14/721,555

(22) Filed: May 26, 2015

(65) Prior Publication Data

US 2015/0345328 A1    Dec. 3, 2015

(30) Foreign Application Priority Data

May 27, 2014   (FR) ...................... 14 54790

(51) Int. Cl.
| | |
|---|---|
| *F01D 25/12* | (2006.01) |
| *F28F 9/013* | (2006.01) |
| *F01D 25/14* | (2006.01) |
| *F01D 11/24* | (2006.01) |
| *F02C 7/18* | (2006.01) |

(Continued)

(52) U.S. Cl.
CPC ............... *F01D 25/12* (2013.01); *F01D 11/24* (2013.01); *F01D 25/14* (2013.01); *F01D 25/28* (2013.01); *F02C 7/18* (2013.01); *F28F 9/0131* (2013.01); *F05D 2260/30* (2013.01);
(Continued)

(58) Field of Classification Search
CPC .......... F01D 25/12; F01D 25/14; F01D 25/28; F01D 11/24; F01D 9/06; F01D 9/065; F16L 3/10; F16L 3/1091; F16L 3/22; F16L 3/223; F16L 3/2235; F16L 3/227; F05D 2260/30; F05D 2260/96; F28F 9/013; F28F 9/0131; F28D 1/04; F28D 1/047

See application file for complete search history.

(56) References Cited

U.S. PATENT DOCUMENTS

| | | | | |
|---|---|---|---|---|
| 4,346,922 A | * | 8/1982 | Ohtsuga ................ | F16L 55/163 138/97 |
| 5,098,047 A | * | 3/1992 | Plumley ................ | F16L 3/2235 248/68.1 |

(Continued)

FOREIGN PATENT DOCUMENTS

| | | | | |
|---|---|---|---|---|
| EP | 0579352 A1 | * | 1/1994 | ............ F16L 3/1033 |
| EP | 2 243 931 A2 | | 10/2010 | |
| FR | 2 995 022 A1 | | 3/2014 | |

OTHER PUBLICATIONS

Preliminary Search Report as issued in French Patent Application No. 1454790, dated Feb. 11, 2015.

*Primary Examiner* — Woody Lee, Jr.
*Assistant Examiner* — Elton Wong
(74) *Attorney, Agent, or Firm* — Pillsbury Winthrop Shaw Pittman LLP

(57) ABSTRACT

A holding device of a cooling tube for a turbojet casing, the holding device including a first plate configured to be arranged in integral contact with a turbojet casing; a second plate, the first and second plates having a gap therebetween; a first spacer and the second spacer which are arranged between the first plate and the second plate and defining the gap between the first and second plates, the first and second spacers having a spacing therebetween suitable for passing the cooling tube.

14 Claims, 9 Drawing Sheets

(51) Int. Cl.
*F01D 25/28* (2006.01)
*F28D 1/047* (2006.01)

(52) U.S. Cl.
CPC .......... *F05D 2260/96* (2013.01); *F28D 1/047* (2013.01); *Y02T 50/675* (2013.01)

(56) References Cited

U.S. PATENT DOCUMENTS

| | | | | |
|---|---|---|---|---|
| 5,271,588 | A | * 12/1993 | Doyle | F16L 3/237 |
| | | | | 248/68.1 |
| 5,271,688 | A | 12/1993 | Doyle | |
| 5,540,547 | A | 7/1996 | Cole | |
| 6,752,359 | B2 * | 6/2004 | Nagenkogl | F16L 3/1091 |
| | | | | 248/228.5 |
| 7,017,865 | B2 * | 3/2006 | Zearbaugh | F16L 3/04 |
| | | | | 248/65 |
| 8,313,065 | B2 * | 11/2012 | Birch | F16L 3/1016 |
| | | | | 138/149 |
| 8,770,537 | B2 * | 7/2014 | Go | E02F 9/2275 |
| | | | | 212/347 |
| 2006/0249636 | A1 * | 11/2006 | Thiedig | F16L 3/1091 |
| | | | | 248/74.4 |
| 2010/0068043 | A1 * | 3/2010 | Shteyman | F01D 25/145 |
| | | | | 415/177 |

\* cited by examiner

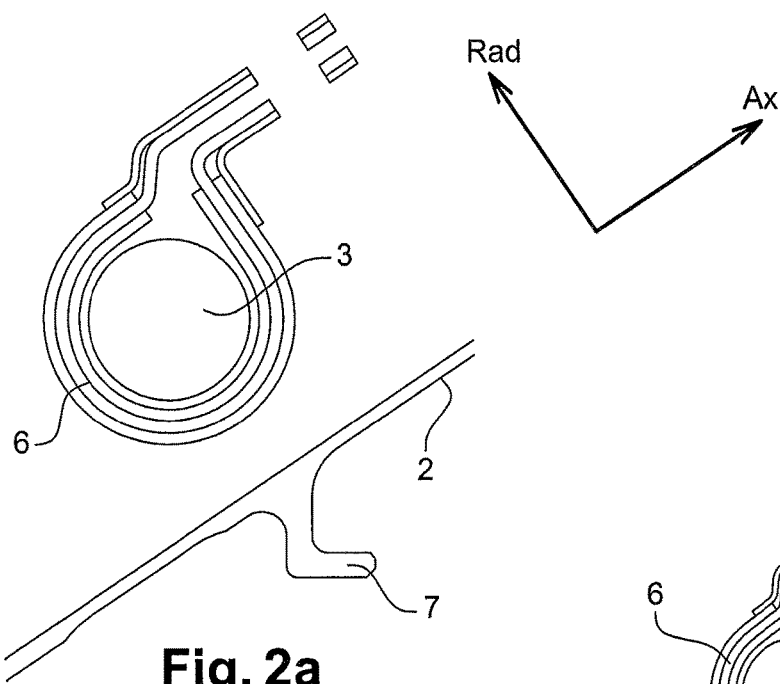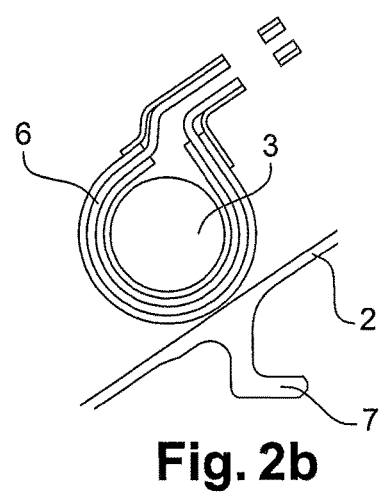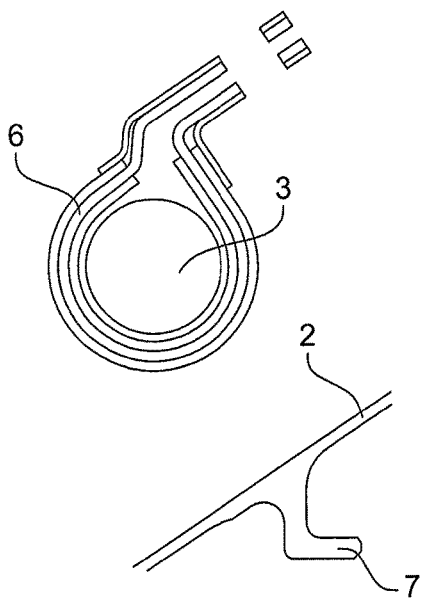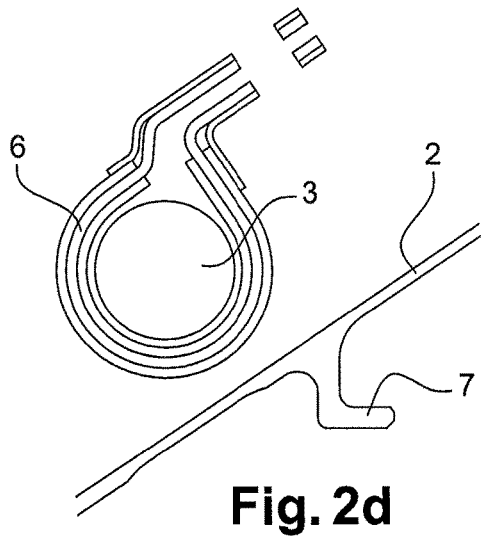
Fig. 2a
Fig. 2b
Fig. 2c
Fig. 2d

HOLDING DEVICE OF A COOLING TUBE FOR A TURBOJET CASING

CROSS-REFERENCE TO RELATED APPLICATIONS

This application claims priority to French Patent Application No. 1454790, filed May 27, 2014, the entire content of which is incorporated herein by reference in its entirety.

FIELD

The technical field of the invention is generally that of aircraft engines, and more particularly that of cooling of different elements, in particular low pressure turbine casings, of the engines considered.

BACKGROUND

To ensure cooling of some low pressure turbine casings, a cooling device is provided which involves a set of cooling tubes provided outside the casing, most often by surrounding the casing, such that air is sent towards the outer face of the casing considered. The cooling tubes are typically fed by several housings, and for example by two housings or four housings. In the case where the cooling tubes are fed by two housings, the latter are typically provided on either side of the casing considered, such that each housing feeds cooling tubes surrounding the casing considered with air on about one quarter of its side circumference. This is called herein an LPTCC (Low Pressure Turbine Clearance Control) type system. The LPTCC system may be controlled by the FADEC (Full Authority Digital Engine Control); this is called herein an active control, the system then being designated by the acronym LPTACC. When it is not controlled by the FADEC, this is called here a passive control for the LPTCC system. Its main function is to regulate the low pressure turbine clearance by modulating the air flow rate taken off from the bypass flow for cooling the low pressure turbine casing.

Cooling tubes, and in particular those of LPTCC systems, are secured via feed housings with the outer face of the casing they cool. Besides, it is desirable to ensure a proper positioning of the cooling tubes acting on the casing, in particular at the farthest places of the feed housings; to that end, it is provided in the state of the art the use of an attachment metal sheet which consists of a flat metal sheet under which collars are attached, the collars surrounding the cooling tubes, enabling the tubes to be held in position.

FIG. 1a shows a first perspective view of a cooling device 1 for a turbojet casing according to the state of the art. FIG. 1a thus shows:
  a turbojet casing 2;
  the cooling device 1 for the turbojet casing 2, the cooling device 1 including:
    a plurality of cooling tubes 3;
    an air feed housing 4 of the plurality of cooling tubes 3;
    a plurality of attachment metal sheets 5 for holding the plurality of cooling tubes 3 in position.

FIG. 1b shows a second perspective view of the cooling device 1 for a turbojet casing according to the state of the art. FIG. 1b shows in particular an attachment metal sheet 5 under which a plurality of collars 6 is attached, each collar 6 surrounding a cooling tube 3. Such a solution does not enable a proper positioning of the cooling device to be systematically ensured with respect to the casing. Axial and/or radial misalignments of the cooling tubes of the cooling device with respect to the casing are thus typically observed.

FIG. 2a schematically illustrates an example of proper positioning of a cooling tube 3 of the cooling device 1 for a turbojet casing, with respect to the turbojet casing 2. In this example:
  the axial positioning, along an axial direction Ax, of the cooling tube is proper, the cooling tube 3 being aligned with a hook 7 of the casing 2, and
  the radial positioning, along a radial direction Rad, of the cooling tube is proper, the radial distance between the cooling tube 3 and the casing 2 being controlled.

FIG. 2b schematically illustrates a first example of improper positioning of the cooling tube 3 with respect to the turbojet casing 2, wherein the cooling tube 3 is in contact with the casing 2. FIG. 2c schematically illustrates a second example of improper positioning of the cooling tube 3 with respect to the turbojet casing 2, wherein the cooling tube 3 is this time very far from the casing 2. Finally, FIG. 2d schematically illustrates a third example of improper positioning of the cooling tube 3 with respect to the turbojet casing 2, wherein the cooling tube 3 is misaligned with respect to a hook 7 of the casing 2.

SUMMARY

An aspect of the present invention relates to a holding device of a cooling tube for a turbojet casing, or several cooling tubes for a turbojet casing.

An aspect of the invention offers a solution to the previously discussed problems, by providing in particular a holding device of a cooling tube for a turbojet casing, the holding device enabling possible axial or side misalignments of the cooling tube with respect to the turbojet engine to be reduced.

An aspect of the invention relates to a holding device of a cooling tube for a turbojet casing, the holding device including:
  a first plate suitable for being arranged in integral contact with a turbojet casing;
  a second plate, the first and second plates having a gap therebetween;
  a first spacer and a second spacer which are arranged between the first plate and the second plate and defining the gap between the first and second plates, the first and second spacers having a spacing therebetween suitable for passing the cooling tube.

In the present description, the turbojet casing typically having a casing body and at least one side rim, by "the first plate is arranged in integral contact with the turbojet casing", it is meant that a not inconsiderable part of the first plate is in contact with the casing body, and the first plate is fixed with respect to the casing. By "not inconsiderable part", it is meant more than one third of the first plate.

The holding device according to an aspect of the invention beneficially includes, with respect to the state of the art, a restricted number of links, which enables the accumulation of tolerances related to each link to be minimized. Thanks to the first and second spacers of the holding device according to an aspect of the invention, the positioning of the cooling tube with respect to the casing is beneficially controlled and optimized: the first and second spacers define the gap between the first and second plates and allow an optimum tightening, without damaging the cooling tube. The holding device according to an aspect of the invention enables in particular possible axial or radial misalignments of the cooling tube with respect to the casing to be avoided, and thus a compact system to be obtained while ensuring the absence of contact between the cooling tube and the turbojet casing.

Besides the characteristics just discussed in the previous paragraph, the holding device according to an embodiment of the invention may have one or more further characteristics from the following ones, considered alone or according to all the technically possible combinations:

the first plate includes a first runner suitable for positioning the cooling tube against the first plate. The first runner beneficially enables the positioning of the cooling tube against the first plate to be facilitated and controlled, and thus to contribute to accurately controlling the position of the cooling tube with respect to the casing.

The second plate beneficially includes a second runner suitable for positioning the cooling tube against the second plate. The second runner beneficially enables the positioning of the second plate against the cooling tube to be facilitated and controlled, and to contribute to accurately control the position of the cooling tube with respect to the casing.

According to one alternative combining both previous characteristics, the second plate beneficially includes the first runner suitable for positioning the cooling tube against the first plate, and the second runner suitable for positioning the cooling tube against the second plate.

The holding device includes a pad suitable for dampening the contact between the cooling tube on the one hand, and the first plate on the other hand. The pad beneficially enables, by dampening the contact and frictions between the cooling tube and the first plate, to contribute to restricting wear of the cooling tube and first plate.

In this case, the pad beneficially comprises a first part arranged on the first plate.

The holding device includes a pad suitable for dampening the contact between the cooling tube on the one hand, and the second plate on the other hand. The pad beneficially enables, by dampening the contact and frictions between the cooling tube and the second one, to contribute to restricting wear of the cooling tube and the second plate.

In this case, the pad beneficially comprises a second part arranged on the second plate.

Alternatively, the holding device includes a pad suitable for dampening the contact between the cooling tube on the one hand, and the first plate and the second plate on the other hand.

In this case, the pad beneficially comprises:
    the first part arranged on the first plate, and
    the second part arranged on the second plate.

The first plate includes a first side tab and a second side tab, the first and second side tabs being suitable for positioning the first plate on the turbojet casing.

The holding device includes:
    a first connecting device of a first type or first connector securing the first spacer to the first plate, and
    a second connecting device of the first type or second first connector securing the second spacer to the first plate.

The first connecting device of the first type or first connector is a controlled tightening element which passes through the first plate on the one hand, and at least one part of the first spacer on the other hand, and the second connecting device of the first type or second first connector is a controlled tightening element which passes through the first plate on the one hand, and at least one part of the second spacer on the other hand.

Alternatively, the first plate, the first spacer and the second spacer form a single piece part.

The holding device includes:
    a first connecting device of a second type or second connector securing the first spacer to the second plate, and
    a second connecting device of the second type or a second second connector securing the second spacer to the second plate.

The first connecting device of the second type or second connector is a controlled tightening element which passes through the second plate on the one hand, and at least one part of the first spacer on the other hand, and the second connecting device of the second type or second second connector is a controlled tightening element which passes through the second plate on the one hand, and at least one part of the second spacer on the other hand.

The second plate includes:
    a first oblong hole for mounting the first connecting device of the second type or second connector, and
    a second oblong hole for mounting the second connecting device of the second type or second second connector.

Alternatively, the second plate, the first spacer and the second spacer form a single piece part.

The first plate, the first spacer, the second spacer and the second plate form a single piece part.

Another aspect of the invention relates to a cooling device for a turbojet casing including:
    a holding device of a cooling tube according to an aspect of the invention, and
    the cooling tube.

The cooling device according to an embodiment of the invention may in particular have the following further characteristic:
    the cooling device includes a sheath suitable for dampening the contact between the cooling tube on the one hand, and the first and second plates on the other hand, the sheath surrounding one part of the cooling tube.

Another aspect of the invention relates to a turbojet casing including a cooling device according to an aspect of the invention.

The cooling device according to an embodiment of the invention may in particular have the following further characteristic:
    the turbojet casing forms a single piece part with the first plate.

The invention and its different applications will be better understood upon reading the description that follows and upon examining the accompanying figures.

BRIEF DESCRIPTION OF THE FIGURES

The figures are presented by way of indicating and in no way limiting purposes of the invention.

FIG. 1b shows a second perspective view of the cooling device for a turbojet casing of FIG. 1a.

FIG. 2a schematically illustrates an example of proper positioning of a cooling tube of a cooling device for a turbojet casing, with respect to a turbojet casing.

FIGS. 2b, 2c and 2d schematically illustrate first, second and third examples of improper positioning of the cooling tube of FIG. 2a with respect to the turbojet casing of FIG. 2a.

FIG. 3b schematically illustrates a cross section view of the holding device of FIG. 3a.

FIG. 4 schematically illustrates a perspective view of a plate of the holding device of FIG. 3a.

FIG. 5a schematically illustrates a partial perspective view of the holding device of FIG. 3a.

FIG. 5b schematically illustrates a second partial perspective view of the holding device of FIG. 3a.

FIG. 6b schematically illustrates a second partial perspective view of the device of FIG. 6a.

FIG. 7b schematically illustrates a second perspective view of the holding device of FIG. 7a.

FIG. 8a schematically illustrates a perspective view of a turbojet casing including the holding device of a cooling tube of FIG. 7a.

FIG. 8b schematically illustrates a second perspective view of the turbojet casing of FIG. 8a.

FIG. 8c schematically illustrates a third perspective view of the turbojet casing of FIG. 8a.

FIG. 8d schematically illustrates a fourth perspective view of the turbojet casing of FIG. 8a.

DETAILED DESCRIPTION

Unless otherwise specified, a same element appearing on different figures has a single reference.

Figure 1A:
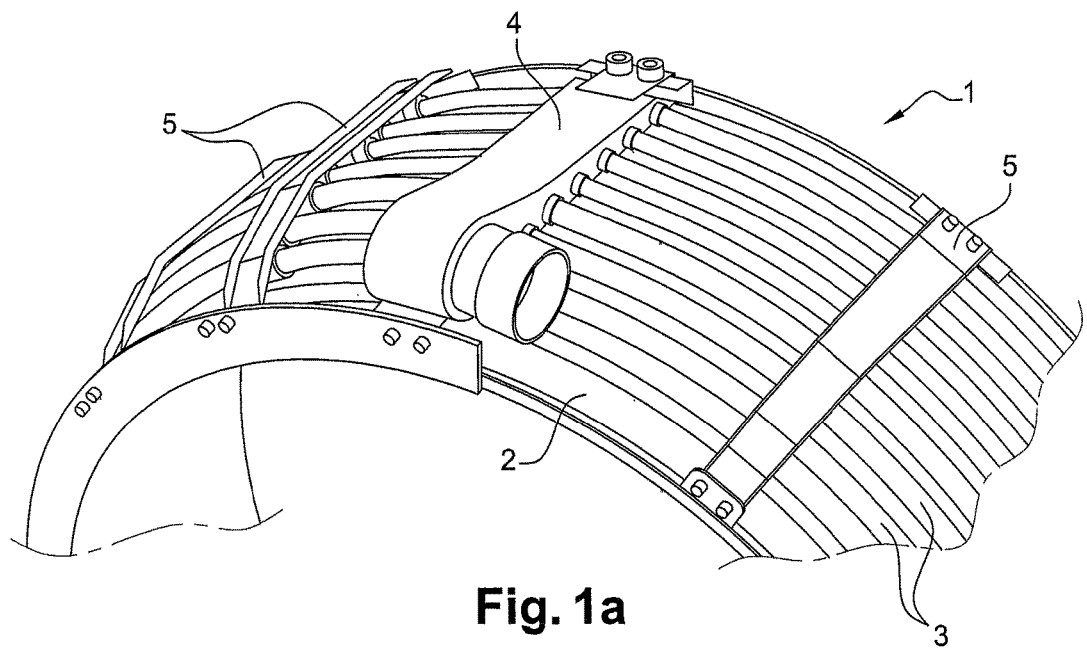
FIG. 1a shows a first perspective view of a cooling device for a turbojet casing according to the state of the art.
Figure 1B:
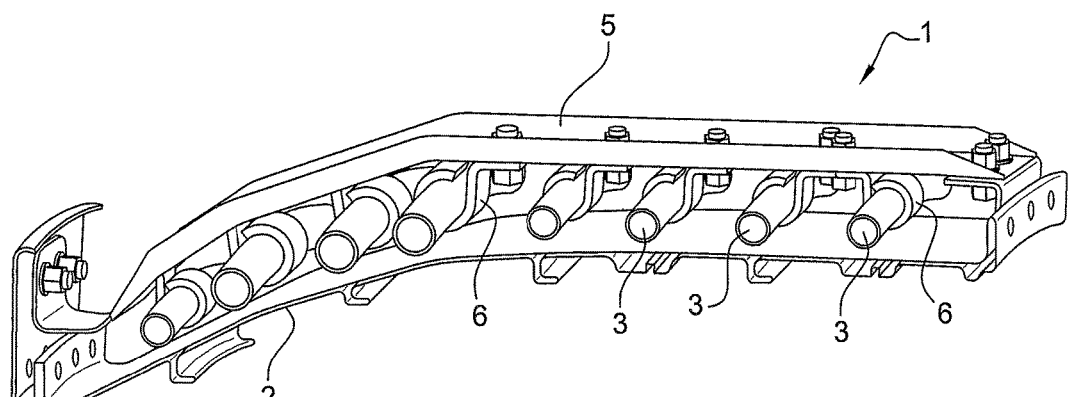

FIGS. 1a and 1b on the one hand, and 2a to 2d on the other hand, have been previously described.

Figure 3A:
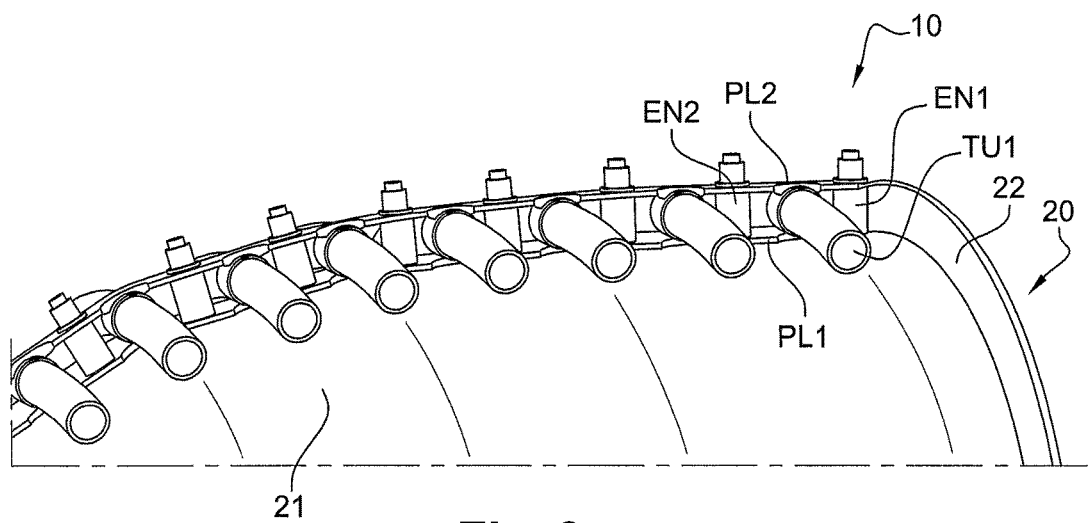
FIG. 3a schematically illustrates a perspective view of a holding device of a cooling tube for a turbojet casing according to a first exemplary embodiment of the invention.
Figure 3B:
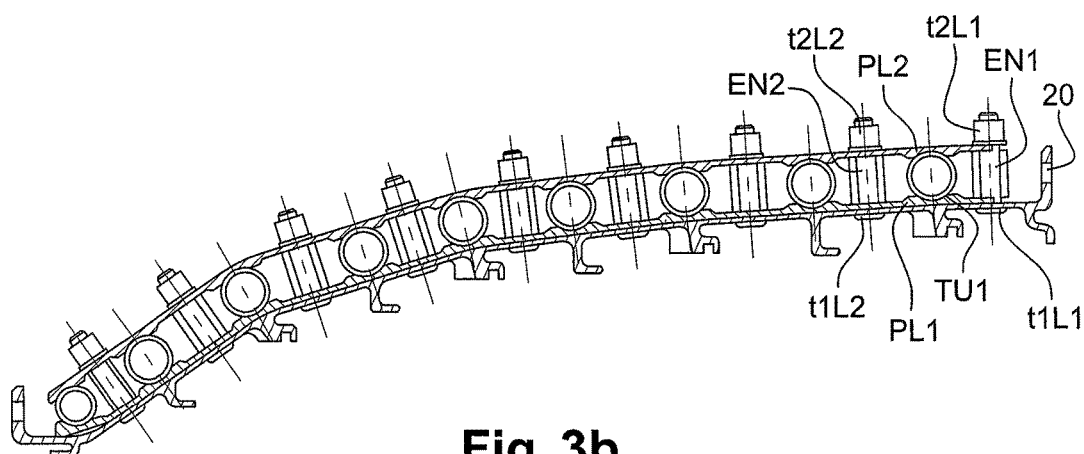

FIG. 3a schematically illustrates a perspective view of a holding device 10 of a cooling tube for a turbojet casing according to a first exemplary embodiment of the invention. FIG. 3b schematically illustrates a cross section view of the holding device 10.

FIGS. 3a and 3b are described together and show in particular:
  a turbojet casing 20;
  a device for cooling the turbojet casing 20, the cooling device including at least one cooling tube TU1 and the holding device 10 of the cooling tube TU1;
  the holding device 10 of the cooling tube TU1 for the turbojet casing 20, the holding device 10 including:
    a first plate PL1, the first plate PL1 being suitable for being arranged in integral contact with the turbojet casing 20;
    a second plate PL2 spaced apart from the first plate PL1;
    a first spacer EN1 and a second spacer EN2 arranged between the first plate PL1 and the second plate PL2, the first and second spacers EN1, EN2 having therebetween a spacing suitable for passing the cooling tube 30.

Since the casing 20 has a body 21 and a side rim 22, the first plate PL1 is in particular in contact with the body 21 of the casing 20. In the example represented in FIGS. 3a and 3b, the first plate PL1 has a first face in full contact with the body 21 of the casing 20, and a second face, opposite the first face, against which the cooling tube TU1 is positioned. Generally, in the present description, by "the first plate PL1 is arranged in integral contact with the casing 20", it is meant that a not inconsiderable part of the first plate PL1 is in contact with the body 21 of the casing 20, and the first plate PL1 is fixed with respect to the casing 20. By "not inconsiderable part", it is meant more than one third of the first plate PL1. The casing 20 may form a single piece part with the first plate PL1, or the first plate PL1 may be attached to the casing 20 by one or more connecting devices or connectors, as will be subsequently described.

FIG. 3b illustrates in particular the first exemplary embodiment, wherein the holding device 10 further includes:
  a first connecting device t1L1 of a first type or first connector securing the first spacer EN1 to the first plate PL1, and
  a second connecting device t1L2 of the first type or second first connector securing the second spacer EN2 to the first plate PL1.

The first connecting device t1L1 of the first type is a controlled tightening element, which passes through the first plate PL1 on the one hand, and at least one part of the first spacer EN1 on the other hand. The second connecting device t1L2 of the first type is a controlled tightening element, which passes through the first plate on the one hand, and at least one part of the second spacer EN2 on the other hand.

In the first exemplary embodiment illustrated in FIG. 3b, the casing 20 and the first plate PL1 are two distinct parts, and the first connecting device t1L1 of the first type and the second connecting device t1L2 of the first type are used to secure the first plate PL1 in contact with the casing 20. To do this:
  the first connecting device t1L1 of the first type passes through at least one part of the first spacer EN1 on the one hand, and the first plate PL1 and the casing 20 on the other hand; and
  the second connecting device t1L2 of the first type passes through at least one part of the second spacer EN2 on the one hand, and the first plate and the casing 20 on the other hand.

In the first exemplary embodiment illustrated in FIG. 3b, the holding device 10 further includes:
  a first connecting device t2L1 of a second type or second connector securing the first spacer EN1 to the second plate PL2, and
  a second connecting device t2L2 of the second type or second second connector securing the second spacer EN2 to the second plate PL2.

The first connecting device t2L1 of the second type is a controlled tightening element, which passes through the second plate on the one hand, and at least one part of the first spacer EN1 on the other hand. The second connecting device t2L2 of the second type is a controlled tightening element, which passes through the second plate on the one hand, and at least one part of the second spacer EN2 on the other hand.

In the first exemplary embodiment which is particularly represented in FIGS. 3a and 3b, the cooling device includes a plurality of cooling tubes TU1 to TUn and the holding device 10 is able to hold the plurality of cooling tubes TU1 to TUn. Generally, when the cooling device includes n cooling tubes TU1 to TUn, the holding device 10 includes:
- (n+1) spacers EN1 to EN(n+1), two consecutive spacers ENk and EN(k+1) having therebetween a spacing suitable for enabling the cooling tube TUk to pass, with 1≤k≤n;
- (n+1) connecting devices t1L1 to t1L(n+1) of the first type, enabling respectively the (n+1) spacers EN1 to EN(n+1) to be secured to the first plate PL1;
- (n+1) connecting devices t2L1 to t2L(n+1) of the second type, enabling respectively the (n+1) spacers EN1 to EN(n+1) to be respectively secured to the second plate PL2.

It is noted that in the case where all the cooling tubes have the same diameter, the spacing between two consecutive spacers is constant, irrespective of the pair of consecutive spacers considered.

The following alternatives of the first exemplary embodiment just described in connection with FIG. 3b may be considered:
- according to a first alternative, the first plate PL1, the first spacer EN1 and the second spacer EN2 form a single piece part;
- according to a second alternative, the second plate PL2, the first spacer EN1 and the second spacer EN2 form a single piece part;
- the first and second alternatives may be combined into a third alternative, according to which the first plate PL1, the first and second spacers EN1 and EN2 and the second plate PL2 form a single piece part;
- according to a fourth alternative, compatible with the first, second and third alternatives just described, the casing 20 forms a single piece part with the first plate PL1.

Figure 3C:
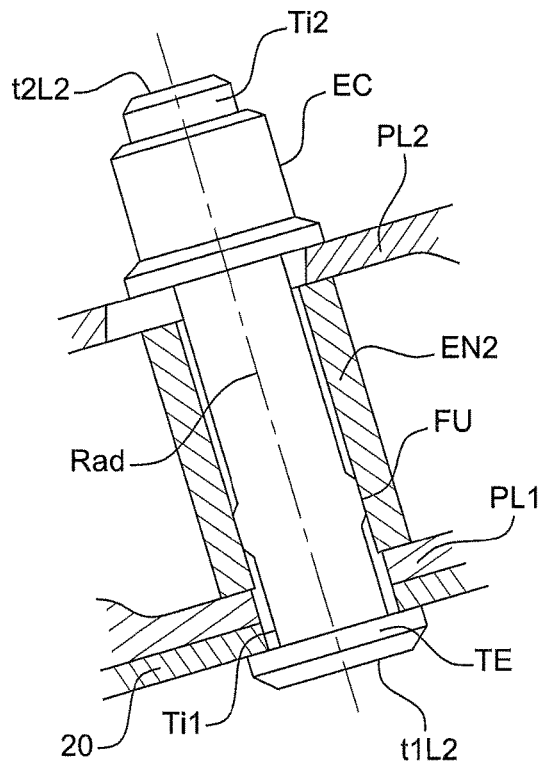
FIG. 3c schematically illustrates a cross section view of a spacer of the holding device of FIG. 3a with a first mounting type.

FIG. 3c schematically illustrates a cross section view of the second spacer EN2 of the holding device 10 according to the first exemplary embodiment, with a first mounting type. According to this first mounting type, the connecting device of the first type of each spacer is snugly fitted to the spacer. Alternatively, the second connecting device of the second type of each spacer may be snugly fitted to the spacer. According to another alternative, for each spacer, the connecting device of the first type and the connecting device of the second type may be snugly fitted to the spacer. The first mounting type with a snug fit enables a stop to be made, along the radial direction Rad, of each connecting device of the first type and/or of the second type. In the particular case of the first mounting type illustrated in FIG. 3c, for the second spacer EN2:
- the second connecting device t1L2 of the first type is a first part of a single fastener;
- the second connecting device t2L2 of the second type is a second part of the single fastener.

The single fastener includes:
- a head TE;
- a rod Ti having a first part Ti1, a second part Ti2 and a fitted strut FU, the first and second parts Ti1 and Ti2 being on either side of the fitted strut FU;
- a nut EC.

The head TE is partly in contact with the casing 20. The first part Ti1 of the rod Ti passes through the casing 20, the first plate PL1 and a first part of the second spacer EN2. The fitted strut FU enables a tightening to be exerted at the second spacer EN2. The second part Ti2 of the rod Ti passes through a second part of the second spacer EN2, as well as the second plate PL2. The second part Ti2 of the rod Ti is at least partly threaded for screwing the nut EC. The nut EC is partly in contact with the second plate PL2.

Figure 3D:
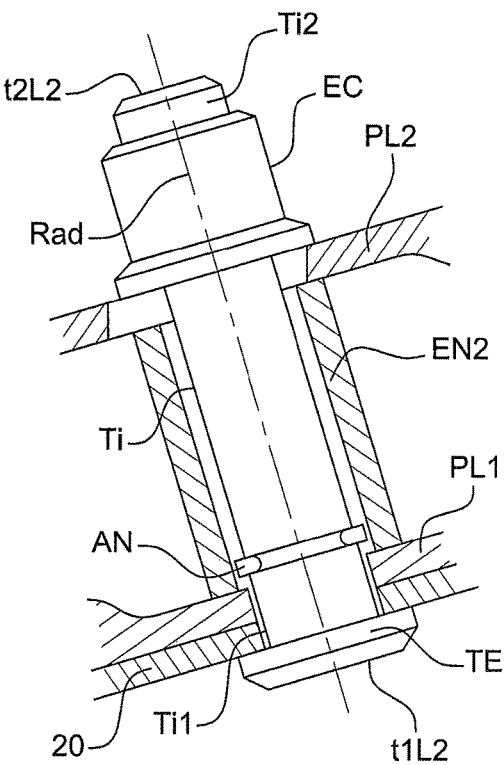
FIG. 3d schematically illustrates a cross section view of the spacer of the holding device of FIG. 3a with a second mounting type.

FIG. 3d schematically illustrates a cross section view of the second spacer EN2 of the holding device 10 according to the first exemplary embodiment of the invention, with a second mounting type. According to this second mounting type, a circlip AN is arranged at each connecting device of the first type. Alternatively, a circlip may be arranged at each connecting device of the second type. According to another alternative, a circlip may be arranged at each connecting device of the first type and at each connecting device of the second type. The second mounting type with a circlip enables a stop to be made, along the radial direction Rad, of each connecting device of the first type and/or the second type.

In the particular case of the second mounting type illustrated in FIG. 3d, the single fastener includes:
- the head TE;
- the rod Ti having the first type Ti1, the second part Ti2 and a groove, the first and second parts Ti1 and Ti2 being on either side of the groove;
- the circlip AN, which is arranged in the groove;
- the nut EC.

Figure 4:
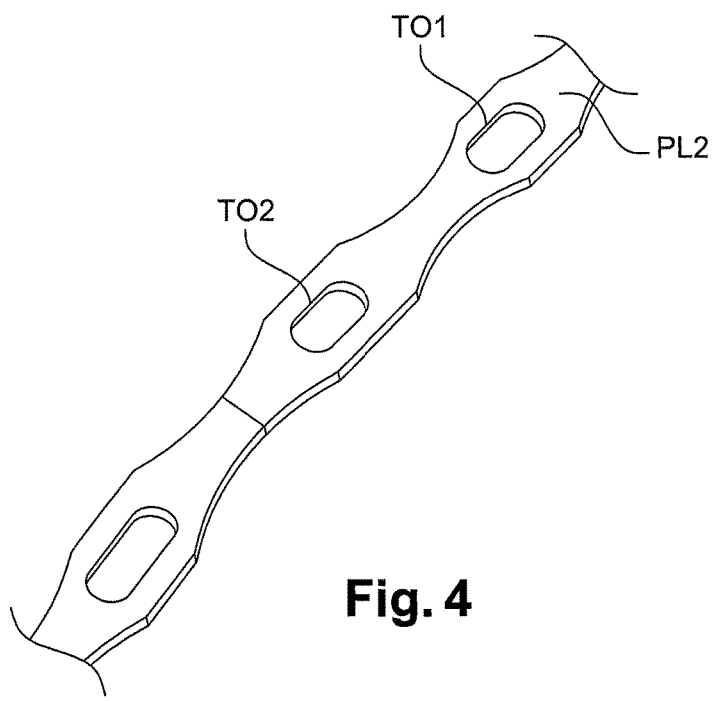

FIG. 4 schematically illustrates a perspective view of the second plate PL2 of the holding device 10 according to the first exemplary embodiment of the invention. The second plate PL2 has:
- a first oblong hole TO1 for mounting the first spacer EN1, and
- a second oblong hole TO2 for mounting the second spacer EN2.

More generally, the second plate PL2 has a plurality of oblong holes TO1 to TO(n+1) for mounting the plurality of spacers EN1 to EN(n+1) of the holding device 10.

The oblong holes enable mounting the connecting devices of the second type to be facilitated, by allowing different mounting angles for the connecting devices of the second type.

Figure 5A:
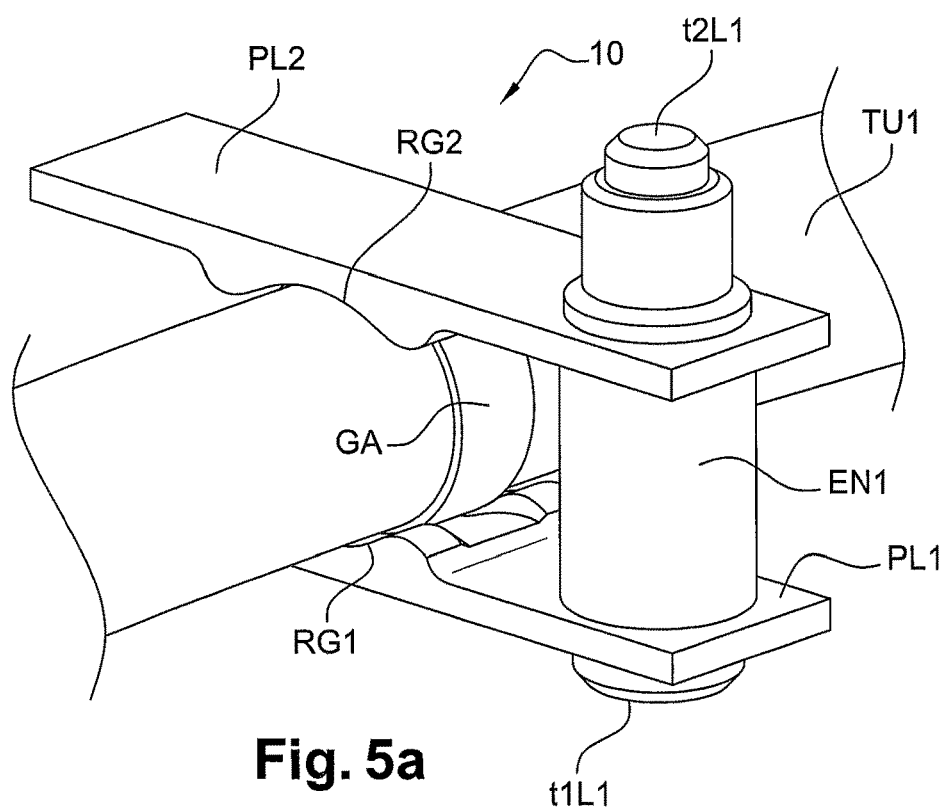
Figure 5B:
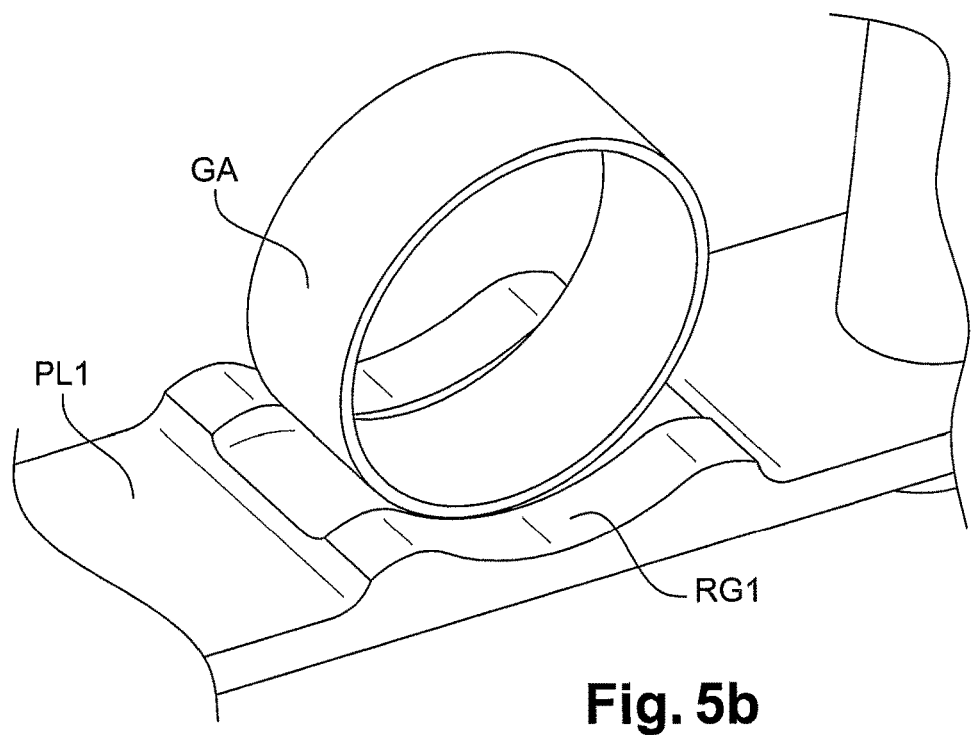

FIG. 5a schematically illustrates a partial perspective view of the cooling device including the holding device 10 according to the first exemplary embodiment of the invention. FIG. 5b schematically illustrates a second partial perspective view of the cooling device including the holding device 10 according to the first exemplary embodiment of the invention.

FIGS. 5a and 5b are described together.

FIG. 5a shows in particular that, according to the first exemplary embodiment:
- the first plate PL1 includes a first runner RG1 for positioning the cooling tube TU1 against the first plate PL1, and
- the second plate PL2 includes a second runner RG2 for positioning the cooling tube TU1 against the second plate PL2.

According to one alternative of the first exemplary embodiment, the first plate PL1 includes the first runner RG1, or the second plate PL2 includes the second runner RG2.

It will be appreciated that, in the case where the cooling device includes a plurality n of cooling tubes TU1 to TUn, the holding device 10 according to the first exemplary embodiment of the invention is such that:
- the first plate PL1 includes a plurality n of first runners RG1, that is the first plate PL1 includes a first runner RG1 for each cooling tube, and/or the second plate PL2 includes a plurality n of second runners RG2, that is the second plate PL2 includes a second runner RG2 for each cooling tube.

FIGS. 5a and 5b show in particular that the cooling device of the turbojet casing 20 includes, according to a first mode of the first exemplary embodiment, a sheath GA suitable for dampening the contact between the cooling tube TU1 on the one hand, and the first and second plates PL1 and PL2 on the other hand, the sheath GA surrounding a part of the cooling tube TU1.

In the first mode, the sheath GA enables wear of the cooling tube TU1 to be restricted. Indeed, the sheath GA enables a direct contact between the cooling tube TU1 and the first and second plates PL1 and PL2 to be avoided. The sheath GA also enables wear of the first and second plates PL1 and PL2 to be restricted. The material of the sheath GA is indeed selected such that during a contact or friction between the sheath GA and the first and second plates PL1 and PL2, it is the sheath GA that wears out, preserving the first and second plates PL1 and PL2. Finally, the sheath GA enables a possible movement of the cooling tube TU1 to be restricted or slowed down.

In the case where the cooling device includes a plurality of cooling tubes, the cooling device includes a dampening sheath GA for each cooling tube of the plurality of cooling tubes.

In the first mode of the first exemplary embodiment which is particularly represented in FIGS. 5a and 5b, the cooling device thus has the following characteristics:
the first plate PL1 includes the first runner RG1, and the second plate PL2 includes the second runner RG2;
the cooling device includes the dampening sheath GA, which surrounds a part of the cooling tube TU1.

In this particular case, the dampening sheath GA is in contact with the first runner RG1 of the first plate PL1 on the one hand, and with the second runner RG2 of the second plate PL2 on the other hand.

Figure 6A:
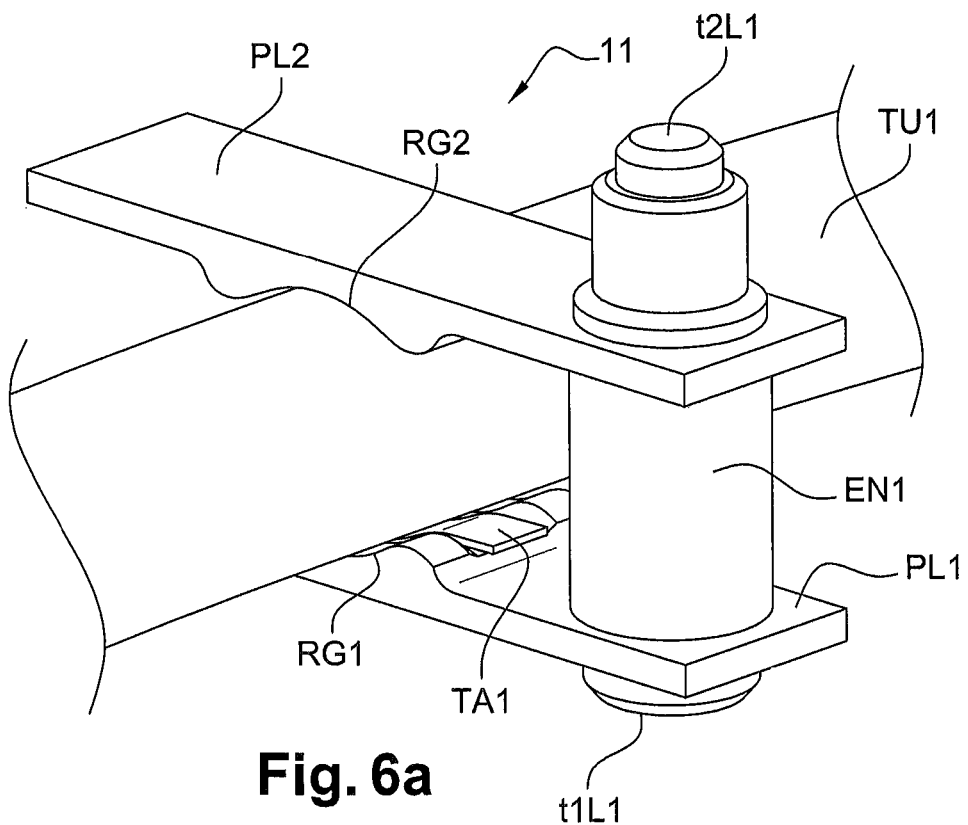
FIG. 6a schematically illustrates a partial perspective view of a holding device of a cooling tube for a turbojet casing according to a second exemplary embodiment of the invention.
Figure 6B:
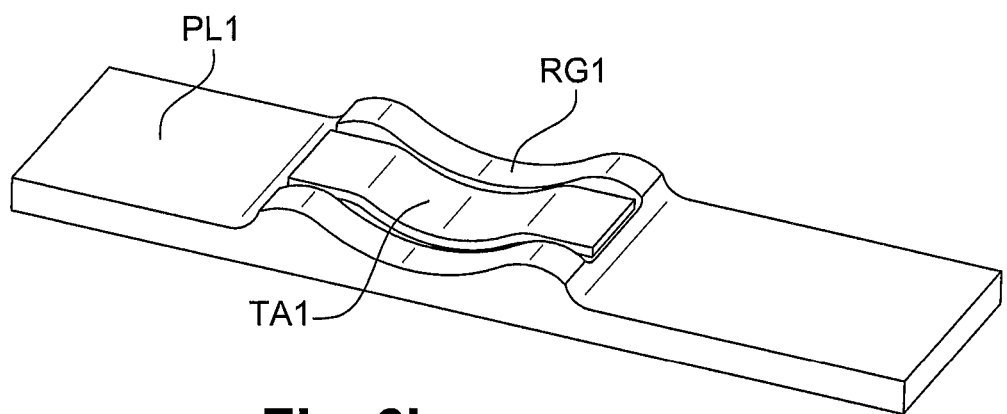

FIG. 6a schematically illustrates a partial perspective view of a cooling device including a holding device 11 according to a second mode of the first exemplary embodiment of the invention. FIG. 6b schematically illustrates a second partial perspective view of the cooling device including the holding device 11 according to the second embodiment of the first exemplary embodiment of the invention. FIGS. 6a and 6b are described together.

FIGS. 6a and 6b show in particular that the holding device 11 according to the second mode of the first exemplary embodiment includes a pad suitable for dampening the contact between the cooling tube TU1 on the one hand, and the first plate PL1 and/or the second plate PL2 on the other hand. To do this, the pad comprises:
a first part TA1 arranged on the first plate PL1, for dampening the contact between the cooling tube TU1 and the first plate PL1, and/or
a second part TA2 arranged on the second plate PL2, for dampening the contact between the cooling tube TU1 and the second plate PL2. The second part TA2 of the pad is not visible in FIGS. 6a and 6b, but is represented in FIGS. 8c and 8d subsequently described. The second part TA2 of the pad is referenced from now on for a better understanding.

In the second mode of the first exemplary embodiment which is particularly illustrated in FIGS. 6a and 6b, the holding device 11 according to the second embodiment of the invention has the following characteristics:
the first plate PL1 includes the first runner RG1, and the second plate PL2 includes the second runner RG2;
the holding device 11 includes a dampening pad, the first part TA1 of which is arranged on the first plate PL1, and the second part TA2 of which is arranged on the second plate PL2.

In this particular case, the first part TA1 of the dampening pad is arranged in the first runner RG1 of the first plate PL1, and the second part TA2 of the dampening pad is arranged in the second runner RG2 of the second plate PL2.

The first and second modes may be combined into a third mode, wherein the holding device includes the dampening pad TA and the cooling device includes the dampening sheath GA.

According to a fourth embodiment of the first exemplary embodiment, the holding device may be without a dampening pad, and the cooling device may be at the same time without a dampening sheath.

A holding device according to a second embodiment will now be described, wherein the first and second plates PL1 and PL2 do not include a positioning runner. This second exemplary embodiment corresponds to a simplified and economical operation, and is in particular compatible with the first, second, third and fourth modes which have been previously described in connection with the first exemplary embodiment.

Figure 7A:
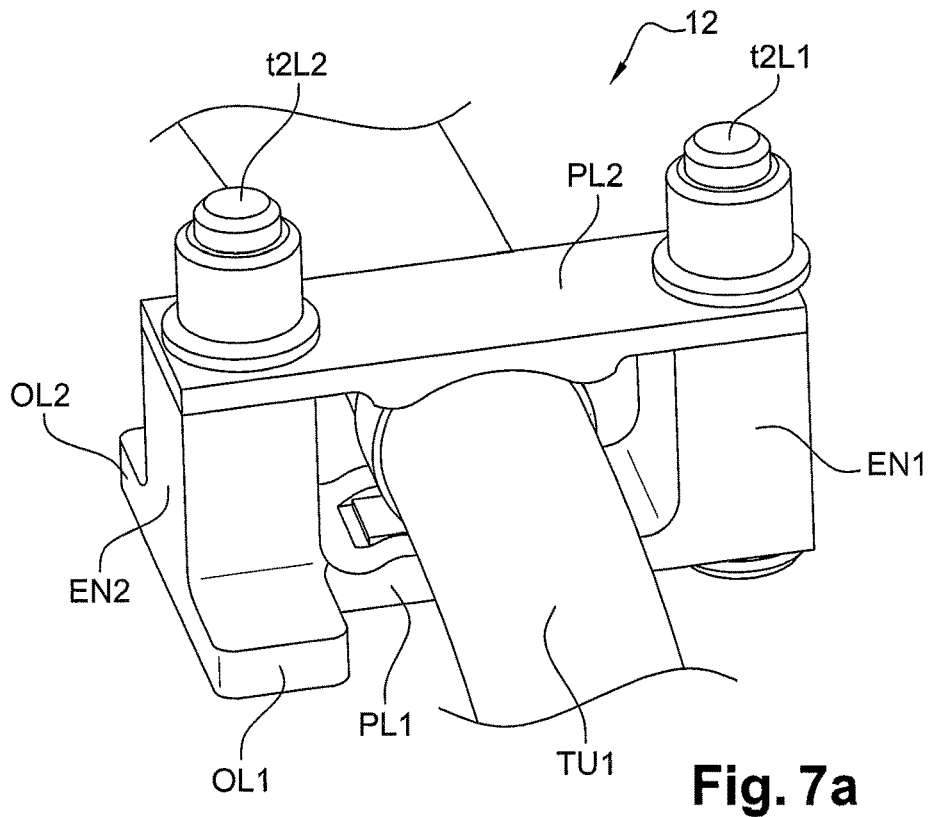
FIG. 7a schematically illustrates a perspective view of a holding device of a cooling tube for a turbojet casing according to a third exemplary embodiment of the invention.
Figure 7B:
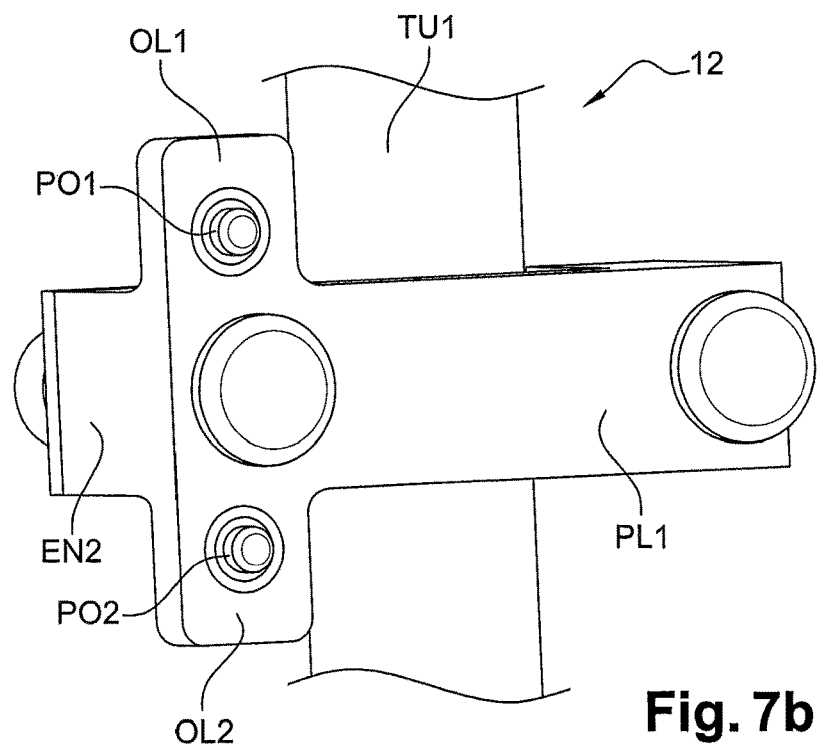

FIG. 7a schematically illustrates a perspective view of a holding device 12 of a cooling tube for a turbojet casing according to a third exemplary embodiment of the invention. FIG. 7b schematically illustrates a second perspective view of the holding device 12 according to the third exemplary embodiment. FIGS. 7a and 7b are described together.

According to the third exemplary embodiment represented in FIGS. 7a and 7b, the first spacer EN1 and the second spacer EN2 form a single piece part with the first plate PL1. The single piece part is for example obtained through machining, that is the single piece part is a machining single piece, by welding or soldering the first and second spacers EN1 and EN2 to the first plate PL1. Alternatively, the first single piece part is a foundry single piece. Generally, using a single piece part enables, by restricting the number of distinct parts and by minimizing de facto tolerances associated with each distinct part, dispersions likely to occur upon tightening to be decreased, when mounting. According to the third exemplary embodiment, the first plate PL1 includes at least:
a first side tab OL1 arranged on a first side of the first plate PL1, the first side tab OL1 including a first positioning pin PO1, and
a second side tab OL2 arranged on a second side of the first plate PL1 opposite the first side, the second side tab OL2 including a second positioning pin PO2.

The first side tab OL1 including the first positioning pin PO1, and the second side tab OL2 including the second positioning pin PO2 enable positioning of the first plate PL1 on the casing 20 to be facilitated and improved.

Figure 8A:
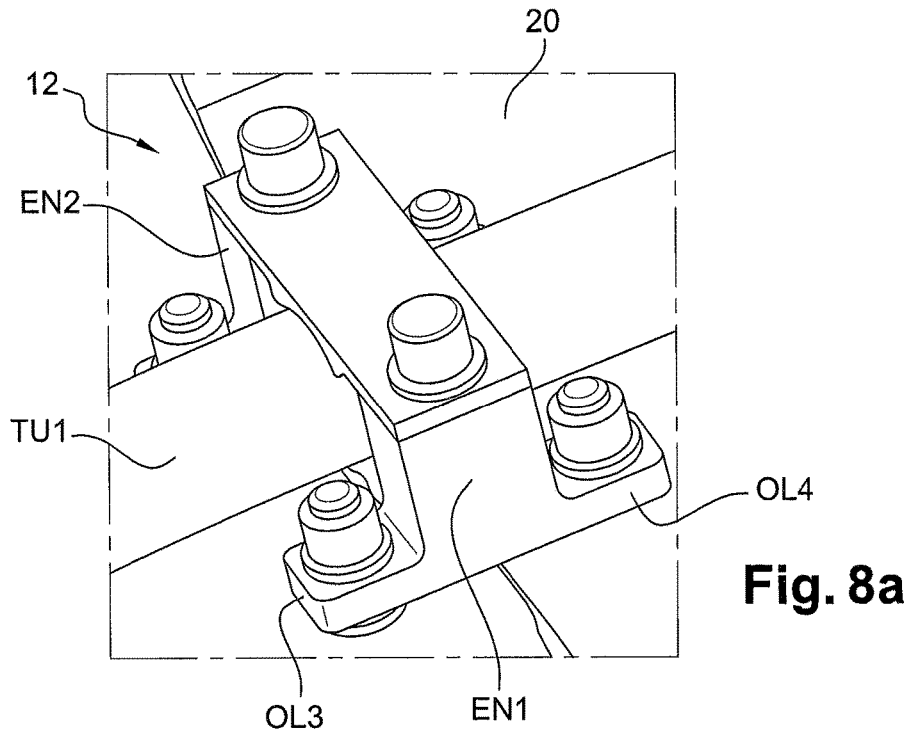
Figure 8B:
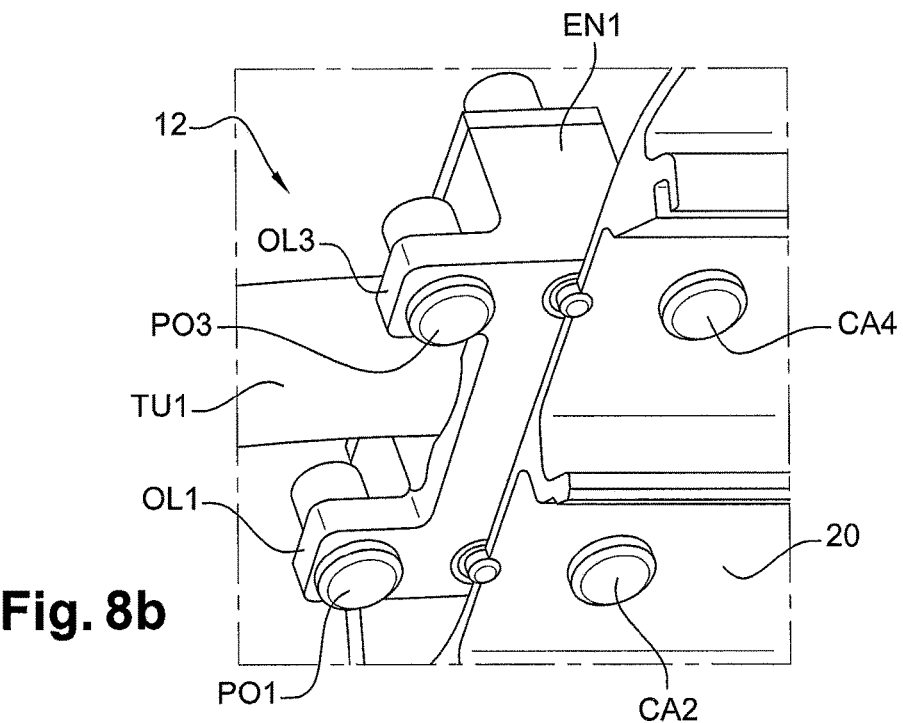
Figure 8C:
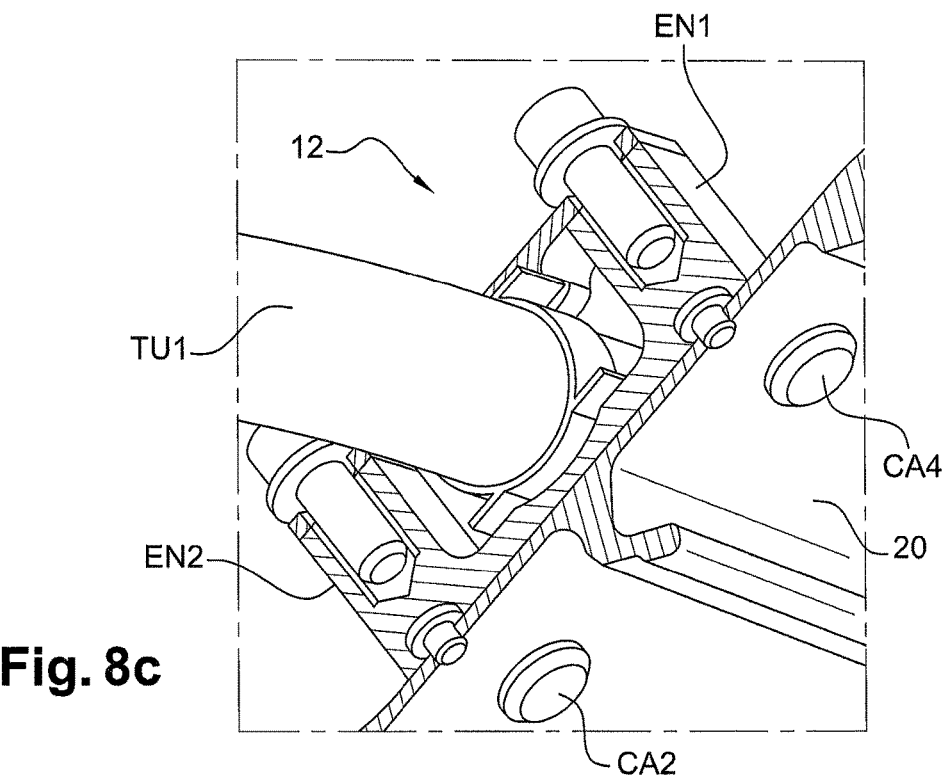
Figure 8D:
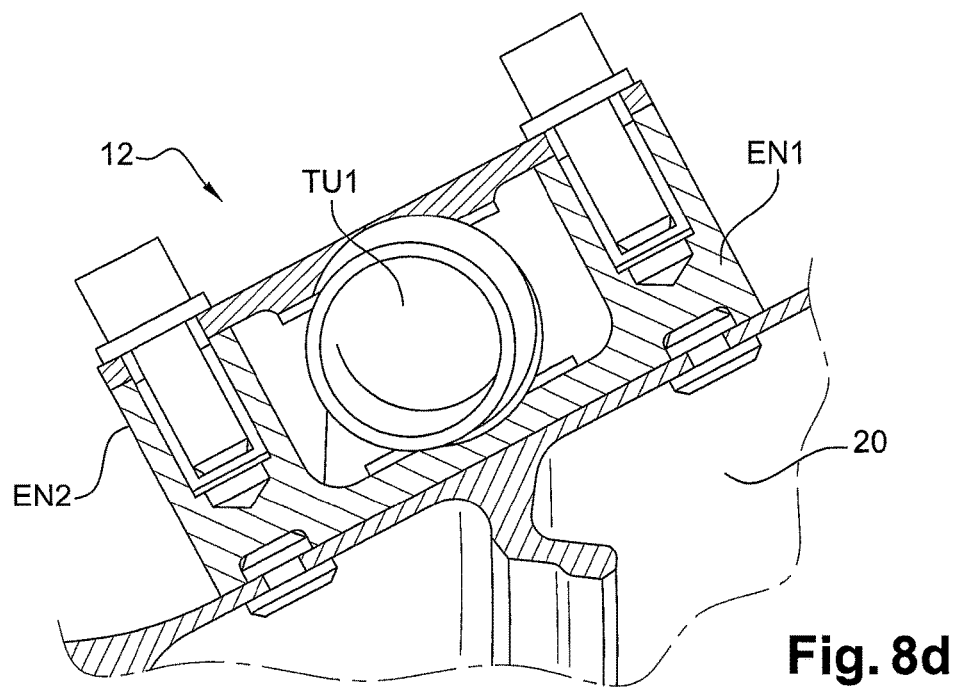

FIG. 8a schematically illustrates a perspective view of the turbojet casing 20, equipped with the cooling device including the holding device 12 according to the third exemplary embodiment of the invention. FIGS. 8b, 8c and 8d, which illustrate second, third and fourth perspective views of the device of FIG. 8a respectively, are described together with FIG. 8a.

FIGS. 8a to 8d thus show the casing 20, to which is mounted the cooling device, including the cooling tube TU1 and the holding device 12 of the cooling tube TU1 according to the third exemplary embodiment of the invention. In the particular case illustrated herein, the first plate PL1 includes:

at the second spacer EN2, on the first side of the first plate PL1: a first tab OL1 including a first positioning pin PO1;

at the second spacer EN2, on the second side of the first plate PL1: a second plate OL2 including a second positioning pin PO2;

at the first spacer EN1, on the first side of the first plate PL1: a third tab OL3 including a third positioning pin PO3;

at the first spacer EN1, on the second side of the first plate PL1: a fourth tab OL4 including a fourth positioning pin PO4.

The casing 20 includes in turn:

a first cavity CA1 accommodating the first positioning pin PO1;

a second cavity CA2 accommodating the second positioning pin PO2;

a third cavity CA3 accommodating the third positioning pin PO3;

a fourth cavity CA4 accommodating the fourth positioning pin PO4.

The invention claimed is:

1. A holding device of a cooling tube for a turbojet casing, the holding device comprising:
   a first plate configured to be arranged in integral contact with a turbojet casing;
   a second plate, the first and second plates having a gap therebetween, and
   a first spacer and a second spacer which are arranged between the first plate and the second plate and define the gap between the first and second plates, the first and second spacers having a spacing therebetween suitable for passing the cooling tube.

2. The holding device according to claim 1, wherein:
   the first plate includes a first runner configured to position the cooling tube against the first plate, and/or
   the second plate includes a second runner configured to position the cooling tube against the second plate.

3. The holding device according to claim 1, further comprising a pad configured to dampen a contact between the cooling tube on the one hand, and the first plate and/or the second plate on the other hand.

4. The holding device according to claim 3, wherein the pad comprises:
   a first part arranged on the first plate, and/or
   a second part arranged on the second plate.

5. The holding device according to claim 1, wherein the first plate includes a first side tab and a second side tab, the first and second side tabs being configured to position the first plate on the turbojet casing.

6. The holding device according to claim 1, wherein the first plate, the first spacer and the second spacer form a single piece part.

7. The holding device according to claim 1, further comprising:
   a first connecting device securing the first spacer to the second plate, and
   a second connecting device securing the second spacer to the second plate.

8. The holding device according to claim 7, wherein the second plate includes:
   a first oblong hole for mounting the first connecting device, and
   a second oblong hole for mounting the second connecting device.

9. A cooling device for turbojet casing including:
   a holding device of a cooling tube according to claim 1, and
   the cooling tube,
   the cooling device including a sheath configured to dampen the contact between the cooling tube on the one hand, and the first and second plates on the other hand, the sheath surrounding a part of the cooling tube.

10. A turbojet casing comprising a cooling device according to claim 9, wherein the turbojet casing forms a single piece part with the first plate.

11. The holding device according to claim 1, wherein the first and second spacers are individual elements that are separately arranged between the first plate and the second plate and separately secured to the second plate by a respective first and second connecting device.

12. The holding device according to claim 1, wherein the first plate, the first spacer and the second spacer form a single piece part, and wherein said single piece part is secured to said second plate only via said first and second spacers.

13. The holding device according to claim 1, wherein more than a third of a lower surface of the first plate is in contact with the turbojet casing.

14. The holding device according to claim 1, wherein the first plate includes a first runner configured to position the cooling tube against the first plate.

* * * * *